United States Patent
Shaygan (10) Patent No.: US 6,969,258 B1
(45) Date of Patent: Nov. 29, 2005

(54) DENTAL MODEL DEMONSTRATING TOOTH ENAMEL LOSS AND GUM RECESSION

(76) Inventor: Farzad Shaygan, 12025 Lambert, Tustin, CA (US) 92782

( * ) Notice: Subject to any disclaimer, the term of this patent is extended or adjusted under 35 U.S.C. 154(b) by 0 days.

(21) Appl. No.: 10/890,884

(22) Filed: Jul. 14, 2004

(51) Int. Cl.[7] ............................................. G09B 23/28
(52) U.S. Cl. ...................................................... 434/263
(58) Field of Search ................................ 434/263, 264, 434/274; 433/74, 213

(56) References Cited

U.S. PATENT DOCUMENTS

| 707,810 | A | | 8/1902 | Wenker |
| 739,980 | A | | 9/1903 | Bryant |
| 1,512,745 | A | | 10/1924 | Carey |
| 1,598,052 | A | * | 8/1926 | Chayes .......................... 434/264 |
| 1,948,059 | A | | 2/1934 | Baugh |
| 2,657,462 | A | | 11/1953 | Arrow |
| 2,674,802 | A | * | 4/1954 | Williams ..................... 434/263 |
| 3,458,936 | A | * | 8/1969 | Tuccillo et al. ............. 434/263 |
| 4,242,812 | A | * | 1/1981 | Randoll et al. ............. 434/263 |
| 4,267,097 | A | | 5/1981 | Michl et al. |
| 4,350,154 | A | | 9/1982 | Feldbau |
| 4,745,961 | A | | 5/1988 | Salandra |
| 4,902,232 | A | * | 2/1990 | Neustadter ................... 434/263 |
| 4,973,251 | A | | 11/1990 | Golub |
| 5,030,102 | A | * | 7/1991 | Lang ........................... 434/263 |
| 5,071,354 | A | * | 12/1991 | Lang et al. .................. 434/263 |
| 5,120,229 | A | * | 6/1992 | Moore et al. ................ 434/263 |
| 5,232,370 | A | * | 8/1993 | Hoye .......................... 434/263 |
| 6,024,568 | A | | 2/2000 | Mathiesen |
| 6,257,895 | B1 | * | 7/2001 | Oestreich .................... 434/274 |
| 6,524,105 | B2 | | 2/2003 | Raffeiner |

* cited by examiner

*Primary Examiner*—Kurt Fernstrom
(74) *Attorney, Agent, or Firm*—Knobbe Martens Olson & Bear, LLP (57) ABSTRACT

Embodiments of the present invention relate to a dental model having teeth with removable enamel mounted in a jaw. Embodiments of the present invention may be adapted to demonstrate tooth erosion with or without gum recession that may result from contact between teeth in the upper and lower jaws. Removed enamel may be retracted into a space within the teeth, into a space within the gums, or manually removed. The model is preferably used to demonstrate tooth enamel loss, gum recession, and their treatments to dental students and patients.

16 Claims, 8 Drawing Sheets

DENTAL MODEL DEMONSTRATING TOOTH ENAMEL LOSS AND GUM RECESSION

BACKGROUND OF THE INVENTION

1. Field of the Invention

Embodiments of the present invention relate to a dental model of teeth with removable enamel mounted in a jaw. Embodiments of the present invention may be adapted to demonstrate tooth erosion and gum recession that results from contact between upper and lower jaws.

2. Description of the Related Art

Enamel is the hard outer shell that covers the visible part (crown) of the tooth. It is the hardest living substance in the body, capable of withstanding the stress of biting, chewing, grinding and rough brushing. But enamel is also very brittle and is prone to cracking and chipping. Moreover, the stress and impact of biting, chewing, grinding, and rough brushing may cause gum recession.

One significant cause of tooth enamel loss is pressure and impact caused by contact between teeth of the upper and lower jaws. For example, the condition of bruxism, which is characterized by idiopathic movement of the mandible, results in grinding of the teeth of the upper and lower jaws. This condition is particularly troublesome during sleep, because during sleep the muscles of the jaw contract more than while the person is awake and can cause the chipping cracking, and removal of tooth enamel from teeth and gum recession. Enamel removal and gum recession may also be caused by rigorous brushing, clenching, and occlusion of teeth.

When the enamel of a tooth is worn away or gums recede, the exposed portion of the tooth often becomes sensitive and is more susceptible to decay. Advanced cases of enamel loss often require the use of crowns to save the teeth.

Dental students and patients would benefit from seeing how the process of contact between teeth of the upper and lower jaws causes removal of tooth enamel and gum recession. While dental teaching models exist, they do not demonstrate the dynamic process of tooth enamel loss. Hence, there remains a need for a dental teaching model which demonstrates the process of tooth enamel loss and gum recession.

SUMMARY OF THE INVENTION

Embodiments of the present invention relate to a dental model of teeth, with removable enamel and receding gums, mounted in a hinged jaw. Embodiments of the present invention may be adapted to demonstrate gum recession and loss of tooth enamel that results from contact between upper and lower jaws.

One preferred embodiment of the dental model comprises teeth with detachable enamel. In one embodiment, the enamel may be manually removed from the surface of the teeth. For example, the enamel that is removed from the teeth may preferably have various shapes, including, but not limited to, flakes or chips. In particularly preferred embodiments, the enamel is automatically removed from the teeth by enamel removing devices.

In one preferred embodiment, tooth enamel removal occurs simultaneously on numerous teeth. In other preferred embodiments, the tooth enamel removal is commenced as a result of contact occurring between teeth of upper and lower jaws.

Removed enamel may preferably retract into a space within teeth, or alternatively, into a space within the gums.

In another particularly preferred embodiment of the model, contact between upper and lower jaws results in recession of the gum lines. Such recession of the gum lines exposes tooth enamel which was previously hidden behind the gums.

In accordance with one preferred embodiment of the present invention, a dental model is disclosed. The model comprises: a jaw member; and at least one tooth attached to the jaw member, wherein the tooth further comprises a removable portion.

In a variation to the dental model, the model further comprises upper and lower jaw members, each having at least one tooth attached thereto. Preferably, the upper and lower jaw members are connected to one another via a hinged articulation, such that the jaw members move relative to one another in a manner resembling a mammalian mouth. In one embodiment of the hinged jaws, the hinged articulation further comprises a spring.

In another preferred variation, the dental model further comprises a plurality of teeth. In one embodiment, at least one tooth is removably seated within a receiving socket in the jaw member.

In another variation to the dental model, the jaw member further comprises artificial gums which contact the tooth along a region where the tooth is attached to the jaw member. The gums preferably comprise an elastic material.

In one preferred embodiment, the removable portion of the tooth is movable to a location between the gums and the tooth. In another variation, the removable portion can be retracted into the tooth.

In another embodiment, the gums are adapted to partially recede into the jaw member. The region of the tooth exposed by the receding gums may be discolored in comparison to the rest of the tooth and/or plurality of teeth. In a variation, the removable portion of the tooth may be located in the region of the tooth exposed by the receding gums. Preferably, the gums partially recede by means of a retracting device.

The removable portion of the tooth may also be adapted to be manually detached from the tooth.

In preferred embodiments, contact between teeth in the upper and lower jaw members causes the removable portion of the tooth to detach from the tooth. Similarly, contact between teeth in the upper and lower jaw members may cause the gums to partially recede into the jaw member.

In one preferred embodiment of the invention, a dental model is disclosed comprising: an upper and a lower jaw member in hinged articulation with one another; a plurality of teeth seated within receiving sockets in each of the upper and lower jaw members, such that a root portion of each tooth resides within a receiving socket and an outer portion extends outwardly from the jaw member, wherein at least one tooth further comprises an enamel portion located on the outer portion of the at least one tooth, the enamel portion being movable relative to the at least one tooth; artificial gums in contact with the at least one tooth and overlapping partially with both the outer portion of the at least one tooth and the jaw member in which the at least one tooth is seated; and an actuator in functional communication with a means for moving the enamel portion, such that upon actuation, the dental model provides a visual demonstration of enamel loss. In one embodiment of the dental model, contact between teeth in the upper and lower jaw members pushes the actuator, thereby causing the means for moving the enamel portion to operate.

In another preferred embodiment of the present invention, a dental model is disclosed, comprising: an upper and a lower jaw member in hinged articulation with one another; a plurality of teeth seated within receiving sockets in each of the upper and lower jaw members, such that a root portion of each tooth resides within a receiving socket and an outer portion extends outwardly from the jaw member, wherein at least one tooth further comprises an eroded enamel portion located on the outer portion of the at least one tooth; retractable artificial gums in contact with the at least one tooth and at least partially covering the eroded enamel portion; and means for retracting the artificial gums, such that upon retraction, the dental model provides a visual demonstration of enamel loss due to receding gums.

DETAILED DESCRIPTION OF THE PREFERRED EMBODIMENT

Figure 1:
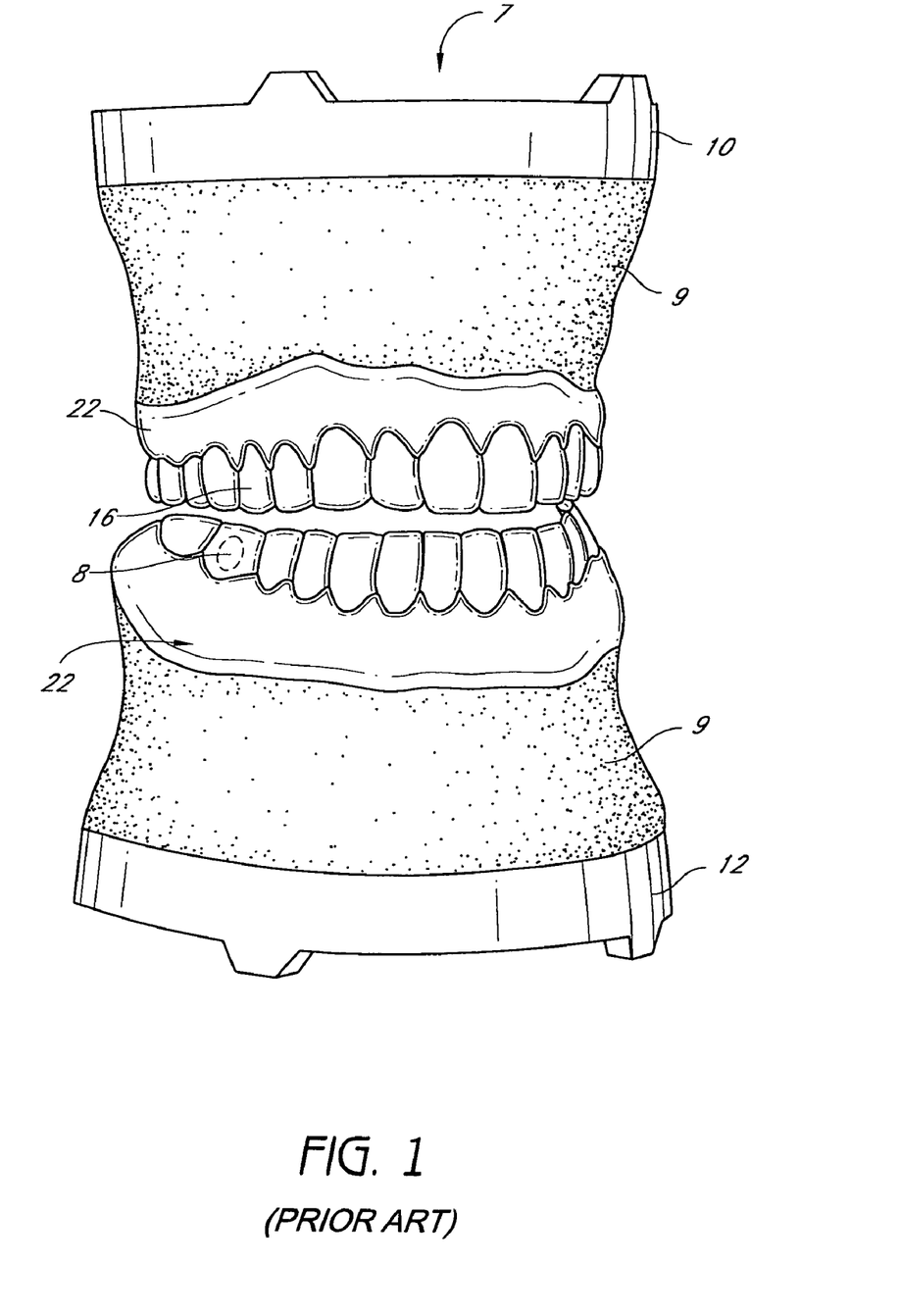
FIG. 1 is a dental model with removable tooth enamel.

As illustrated in FIG. 1, embodiments of the present invention relate to a dental model 7 of teeth 16, with removable enamel 8 and receding gums 22, mounted in a jaw 9 which is attached to frame members 10 and 12.

Figure 2:
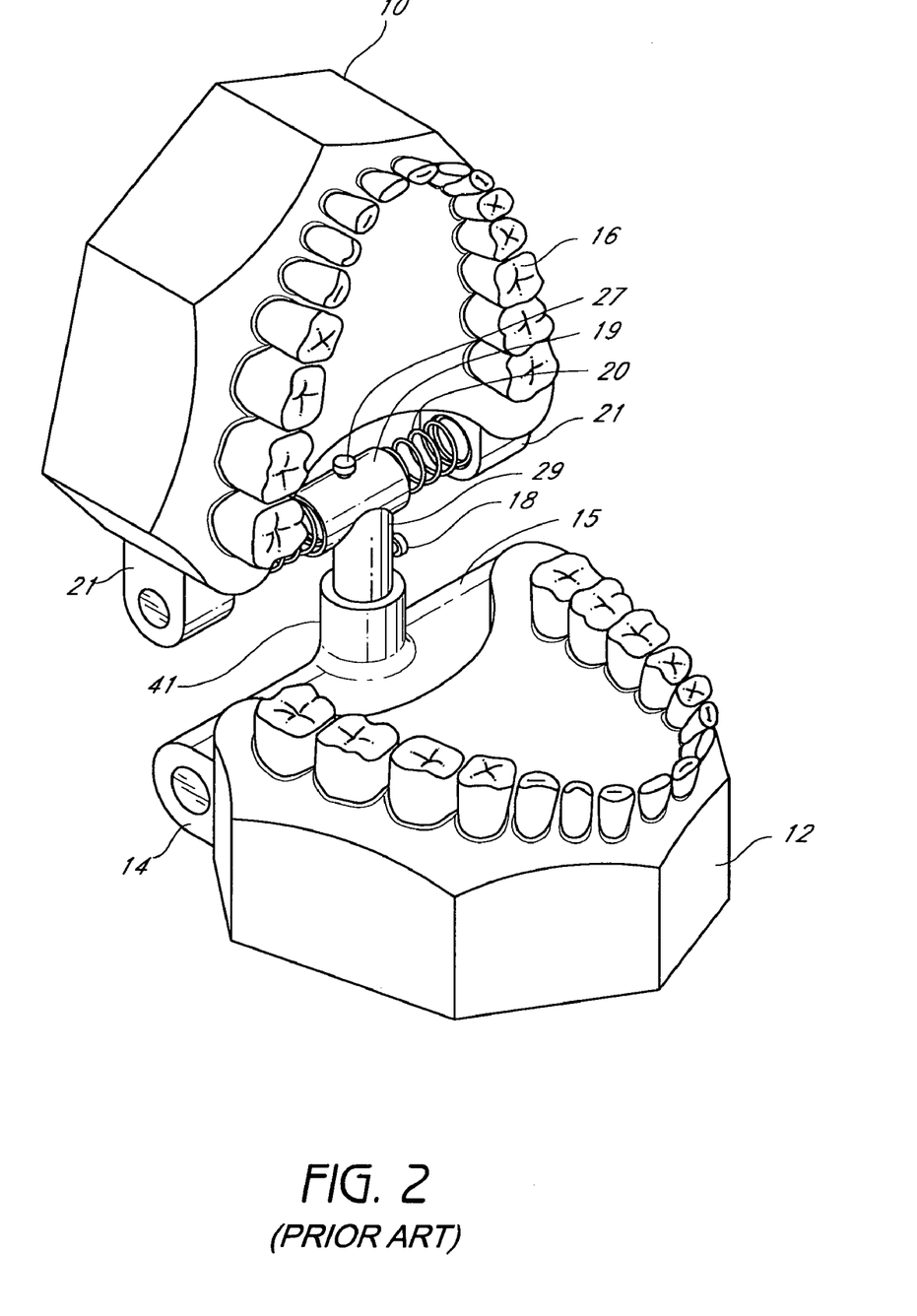
FIG. 2 is a dental model with upper and lower jaws attached to a hinge.

A dental model with a hinge is disclosed in U.S. Pat. No. 1,598,052, which is herein incorporated in its entirety by reference thereto. As illustrated in FIGS. 1 and 2, preferred embodiments comprise upper and lower jaws 9 attached to frame members 10 and 12. FIG. 2 shows that the frame members 10 and 12 have a flexibly hinged relationship to each other which is designed to simulate the actual relationship of the human jaw members 9 to each other. Of course, other types of hinges or movable articulations known in the art are encompassed within the present disclosure. In the embodiment illustrated in FIG. 2, flexibly hinged relationship between the upper and lower jaws is accomplished by providing the lower frame member 12 with rearwardly projecting studs 14 in which is mounted a horizontally extending rod member 15 provided at an intermediate portion with upstanding socket members 41. The socket member 41 is designed to receive an upper jaw supporting member 29 which is held in the socket 16 in any desired angular position of adjustment by means of the set screw 18.

The supporting member 29 is provided with a horizontally extending tubular portion 10 which supports a resilient helically coiled spring member 20 whose opposite ends are seated in rearwardly extending lugs 21 formed on the upper frame member 10. This construction provides a resilient and hinged connection between the upper and lower frame members 10 and 12 through which the registration and engagement of the upper and lower teeth 16 can be readily accomplished. Longitudinal movement of the spring member 20 in the seat 19 can be prevented or the longitudinal position of the spring 20 adjusted in the seat through the use of a set screw 27. Other springs and spring configurations known in the art, such as for example, leaf springs, vertical coil springs, pneumonic springs, etc. are all encompassed within the present disclosure.

In one preferred embodiment, the hinged upper and lower jaws have a spring which is configured so as to maintain the jaw in an open state. In other embodiments, the spring is configured so as to maintain the jaw in a closed state. In some other embodiments, the hinged jaws do not have any spring and can be moved freely from between the open and closed state.

It will be seen that by the flexible articulation thus provided the mutually contacting portions of the tooth members can be brought into fitting and registering relation in much the same way that the registration of actual teeth or of artificial teeth in the human jaws can be accomplished through the flexible hinged relationship between the jaws which is actually provided in nature.

A dental model having a support plate and overlapping gum mass is disclosed in U.S. Pat. No. 6,524,105, which is herein incorporated in its entirety by reference thereto. In the preferred embodiment exemplified in FIGS. 3–5, the dental model has a support plate with recesses for artificial teeth, each of which has a tooth stump that fits into the associated recess. A gum mass preferably overlaps both the teeth of a row of teeth and the recesses. The teeth are each disengageably held on the plate and in their associated recess with friction. The lower portions of the disengageable teeth, which when engaged are concealed within the gums, may preferably contain undesirable characteristics known to those in the art. When the teeth are disengaged from the gums, the exposed portions of the teeth that were once concealed by the gums can be used to teach students and patients about the problems that may result from enamel loss and gum erosion. Such characteristics preferably include, but are not limited to, tooth discoloration, tooth erosion, tooth brittleness, loss of attached gingivae, tooth fracture, tooth cracking, pain resulting from chewing or extreme temperature changes, loss of vertical dimension of occlusion, loss of periodontium, tooth mobility, tooth loss, and other undesirable conditions known to those skilled in the art.

Figure 3:
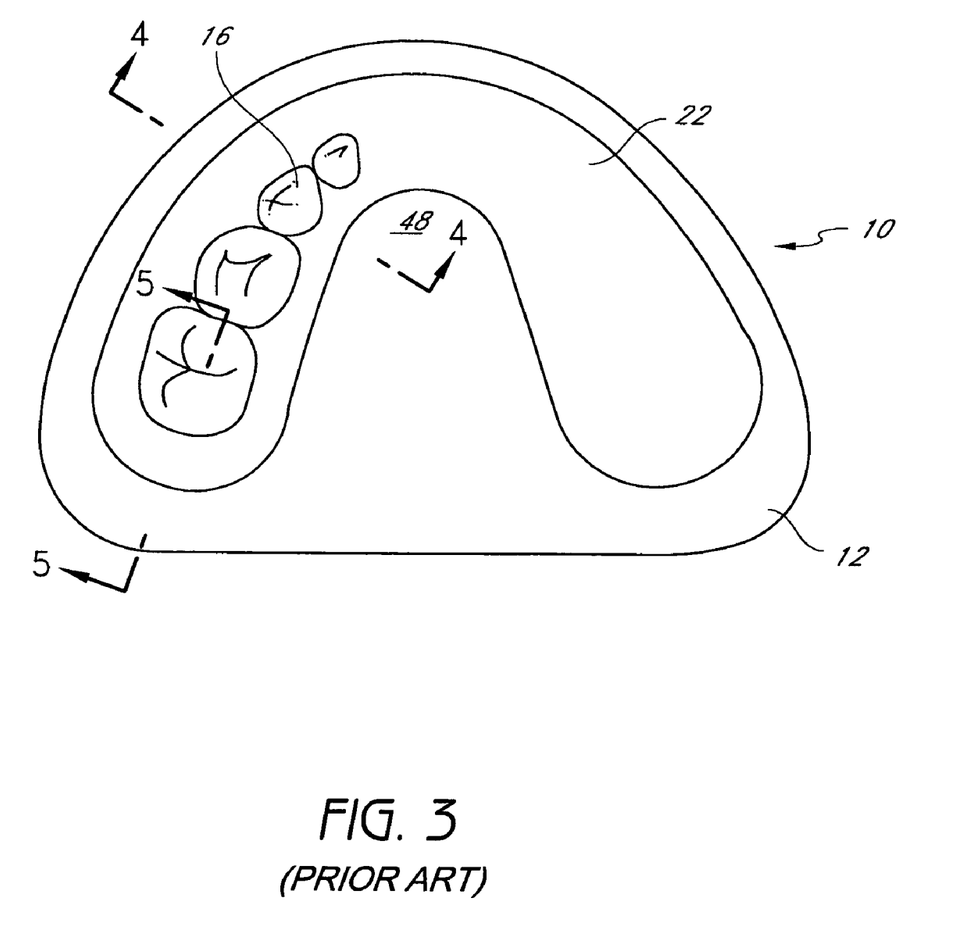
FIG. 3 is a top-view of a dental plate of one embodiment of the invention.
Figure 4:
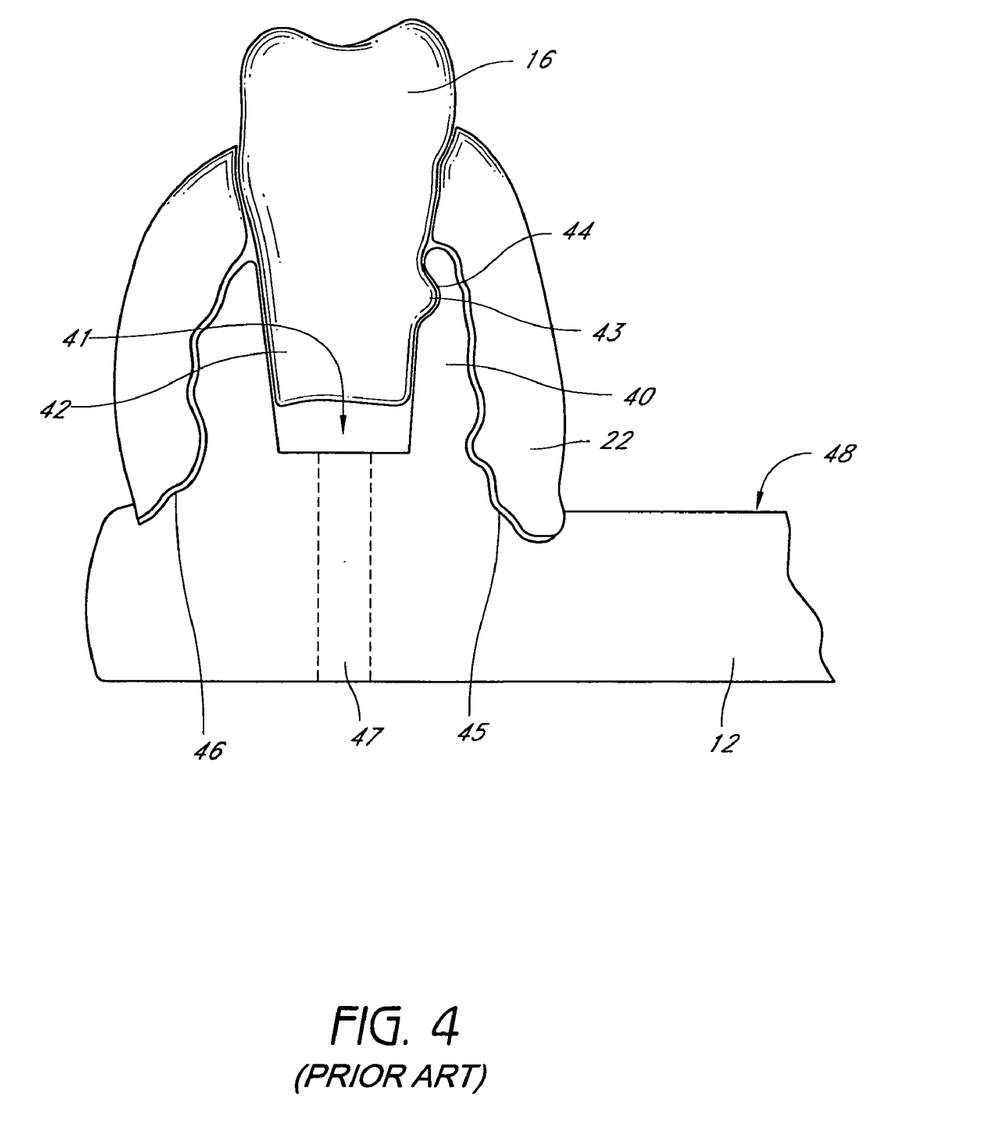
FIG. 4 is a schematic sectional view along the line I—I in FIG. 3, illustrating a detail of a dental plate in accordance with the invention.

The dental model 7 shown in a top-view in FIG. 3 is illustrated in substantial detail in a cross-sectional view along line I—I in FIG. 4. The dental model has a plate 12 that is integrally constructed and that carries an alveolar crest 40 that has a plurality of recesses that are embodied suitably for receiving teeth 16.

FIG. 4 illustrates a tooth. In one embodiment of the model tooth, a recess or receiving cup 41 has inclined, upwardly diverging sides. Fitting therewith, the tooth 16 has a tooth stump or root 42 that is embodied conically. The tooth stump 42 and the recess 41 are not circular; rather, they are preferably oval, and the fit is selected such that a certain free space remains between the tooth stump 42 and the bottom 60 of the recess 41.

Due to the slight cone angle, the tooth 16 can be already fixed fairly securely in the recess 41. In variations to this model, the tooth stump 42 and recess 41 can have any other complementary configurations, such as for example, circular, polygonal, irregular, etc., wherein the tooth 16 can preferably be seated securely, but not permanently, within the recess 41 (i.e., relative movement of the tooth 16 within the recess 41 may be preferred in some embodiments, as detailed below).

Extending laterally away from an outer surface of the tooth stump 42 is a protuberance of some type, e.g., a lug or peg, 43 that precisely orients and supports the tooth 16 as described below. The peg 43 rests within a complementary receiving recess 44 in the alveolar crest 40, whereby the clamping effect between tooth stump 42 and recess 41 is not negatively affected. The cone angle of the tooth stump 42 is preferably between 2 degrees and 20 degrees, more preferably between 5 degrees and 12 degrees, and most preferably about 8 degrees. Such an embodiment provides disengageable clamping.

Provided surrounding the alveolar crest and intensively covering it and also a part of the teeth 16 is an elastic mass for the gum mass 22; it ensures a connection between the plate 12 and the teeth 16. The gum mass 22 is made from any material, preferably an elastic polymeric material, for example a gum-colored dyed silicone rubber. The gum mass 22 surrounds the teeth in a manner that is like the manner in which natural gums surround teeth. The alveolar crest 40 has a receiving recess 44 into which the peg 43 fits precisely. Once the peg 43 is engaged within the receiving recess 44, it resists disengagement. Although the resistance is such that it can be overcome when pulling the tooth 16 from the recess 41.

In accordance with some embodiments of the invention, it is particularly advantageous that the receiving recess 44 in the upper region 62 of the alveolar crest 40 is held by a cam-shaped peg 43. At that point the alveolar crest is still relatively elastic so that it is possible to pull the tooth out. The recess' 44 holding of the peg 43 helps to secure the tooth stump 42 within the recess 41.

Preferably the gum mass 22 rests against the teeth 16 with a slight pre-stress. This means that drilling material that falls cannot penetrate into the bearing gap.

Furthermore, the gum mass has structured surfaces 45 and 46 that face the alveolar crest 40. These surfaces are a negative image of the associated surfaces of the alveolar crest 40, thus stabilizing and improving the connection between the plate 12 and gum mass 22.

In the exemplary embodiment illustrated in FIG. 4 a bore or through-hole 47 is provided such that it passes through the plate 12. Preferably, it extends approximately in the center between the underside of the plate 12 and the recess 41. If necessary, the tooth 16 can be pressed out via this bore 47 using a suitable article, e.g. a rod or thick nail. Despite the very secure and drill-stable bearing or support of the tooth on the plate 12, this solution permits the tooth to be exchanged as needed.

Furthermore it is provided that the gum mass 22 ends somewhat below the upper side 48 of the plate. The plate 12 has fitting edge connection depressions and the gum mass 22 extends correspondingly, as can be seen in FIG. 4. This embodiment improves support while reducing the tendency to become soiled.

Figure 5:
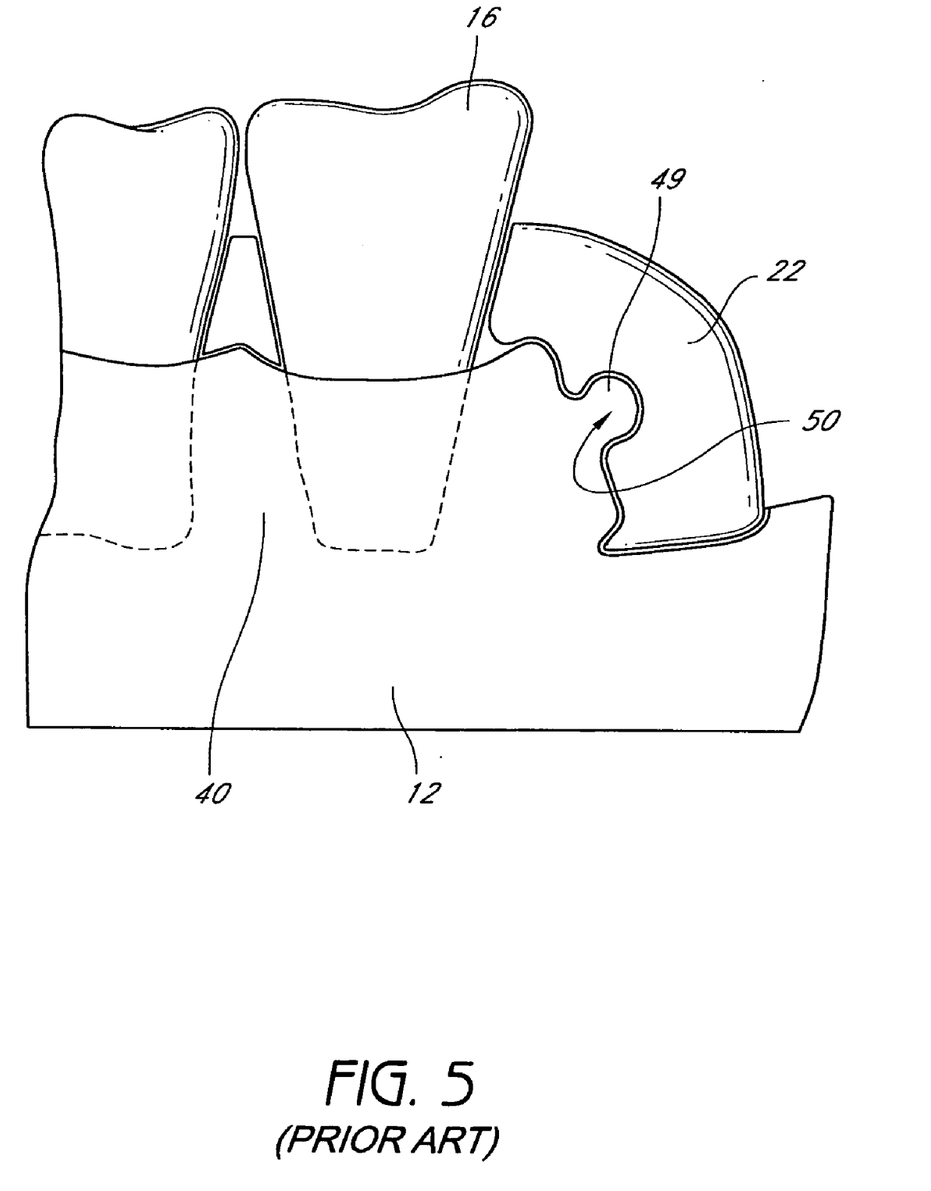
FIG. 5 is a schematic sectional view along the line II—II in FIG. 3, illustrating a detail of a dental plate in accordance with the invention.

FIG. 5 shows that the plate 12 is also connected to the gum mass by additional back tapers or undercuts. In this regard, provided on the rearward end of the alveolar crest 40 is a lug or peg 49 that penetrates into an associated recess 50 in the gum mass 22. A plurality of corresponding connections are also provided distributed across the alveolar crest so that overall the gum mass 22 is well secured to the plate 12. The gum mass 22 is able to disengage the plate 12 due to the gum mass' elasticity.

Methods for making dental models are disclosed in U.S. Pat. Nos. 6,524,105 to Raffeiner; 6,024,568 to Mathiesen et al.,; and 5,120,229 to Moore et al., each of which are herein incorporated by reference. As can be seen from FIG. 3, the gum mass 22 is preferably U-shaped and extends across the plate 12 following the alveolar crest. The teeth 16 are preferably arranged in a row that coincides with the arrangement of real teeth. In one preferred embodiment, the material for the plate 12 is a fairly stiff yet inexpensive plastic material, e.g. an epoxy resin. Other materials can be used consistent with the design features, such as for example, metals, woods and plastics. Based on the slender embodiment of the alveolar crest 40 shown in FIG. 3, however, there may be preferred a certain elasticity so that the model demonstrates similar mechanical conditions that exist in the mouth of a patient.

The teeth 16 are preferably produced from two or more layers. Preferably they have a cutting and dentine layer, whereby the tooth stump 42 is an additional layer. In one preferred embodiment, the hardness of the cutting and dentine layer and of the neck of the tooth is essentially comparable to that of a natural tooth so that the practicing student or patient will find the same qualities in the dental model that would be found in the natural teeth of a patient.

The teeth 16 are preferably made of a composite material and are industrially pre-fabricated. Such materials are described, e.g. in U.S. Pat. Nos. 4,267,097 (equivalent to DE 24 03 211 C2) or in CA 2,051,333 (equivalent to DE 40 29 230 C2), the disclosures of which are hereby incorporated into this application by this reference thereto.

The elastomeric adhesive is typically at least 0.1 millimeter in thickness about most of the root area of the teeth, to provide general spacing between the stumps or roots of the teeth and the walls of the recesses or sockets. Thus, a desired, small amount of flexibility of mounting, simulating the actual clinical situation of a dental patient, can be provided.

While model teeth may be used, for example, teeth made of epoxy molding compound with anatomically-shaped roots, real teeth which have been extracted from patients may also be used, if desired. The tooth-receiving sockets of the jaw member may be somewhat oversized so that the teeth fit loosely therein, being retained by a elastomeric adhesive. Thus, the teeth may be positioned in the socket in a variety of desired angles. Alternatively, the teeth may fit relatively closely in the sockets.

Typically, the elastomeric adhesive may be made of room temperature curing silicone rubber, for example Silastic medical adhesive made by the Dow Corning Corporation. Often, the thickness of elastomeric adhesive about the tooth root may be greater than 0.1 millimeter, for example up to about 2 millimeters.

In one preferred embodiment, the artificial jaw member may be made of any desired material, for example plastic such as epoxy molding compound, or dental stone.

Embodiments of the present invention may be adapted to demonstrate gum recession and tooth enamel removal that results from contact between upper and lower jaws.

FIG. 1 shows one preferred embodiment of the dental model 7, which comprises teeth 16 with removable enamel 8. In one embodiment, the enamel may be manually removed from the surface of the teeth. For example, the enamel that is removed from the teeth may preferably have various shapes, including, but not limited to, flakes or chips.

Figure 6A:
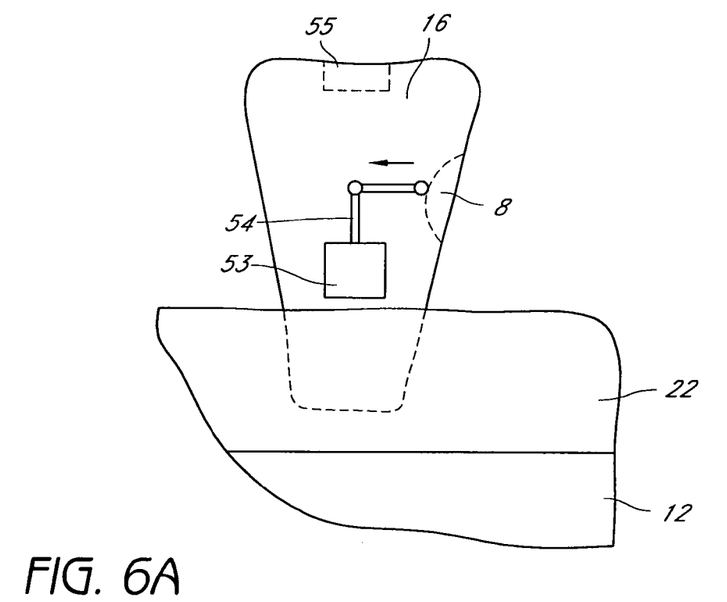
FIGS. 6A and 6B are schematic side views of a tooth embedded in the gum, showing retractable enamel and an enamel-removing device.
Figure 6B:
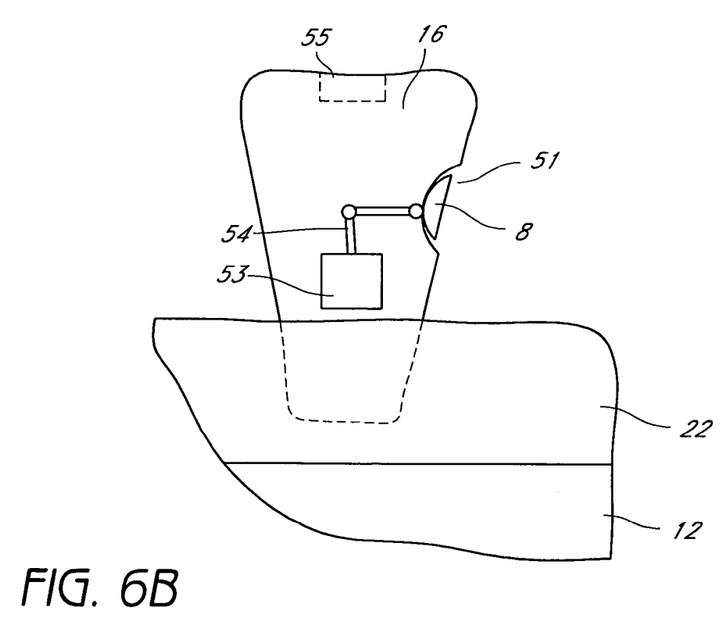

FIGS. 6A and 6B show side sectional views of a particularly preferred embodiment, wherein the removable enamel 8 is retracted into a enamel-receiving space 51 within a tooth 16. A retracting device 53 preferably causes an enamel-removing member 54, which is attached to the removable enamel 8, to pull the removable enamel into the enamel-receiving space 51 within the tooth 16, as illustrated in FIG. 6B. The resulting configuration, wherein the removable enamel 8 is retracted into the enamel-receiving space 51, can be used to depict a tooth from which a region of enamel has been lost. In one preferred embodiment, the retracting device 53 comprises an electric or battery powered motor. In particularly preferred embodiments, a contact sensor 55 is embedded beneath the surface of tooth, and is adapted to sense contact between teeth of upper and lower jaws. When upper and lower teeth contact each other, the sensor preferably sends a signal through a wire, radio wave, or other signaling mechanism known to those skilled in the art, which causes the retracting device 53 to move the enamel-removing member 54. In particularly preferred embodiments, the process may be reversed and repeated. Preferred embodiments of the present invention comprise a plurality of teeth similar to the one depicted in FIG. 6A. The process of enamel removal may occur simultaneously in a plurality of teeth. Preferred embodiments of the enamel removal process/system may be utilized in a variety of tooth types on upper and lower jaws, including: incisors, cuspids, bicuspids, canines, premolars, molars, and other forms of teeth known to those skilled in the art.

Figure 7A:
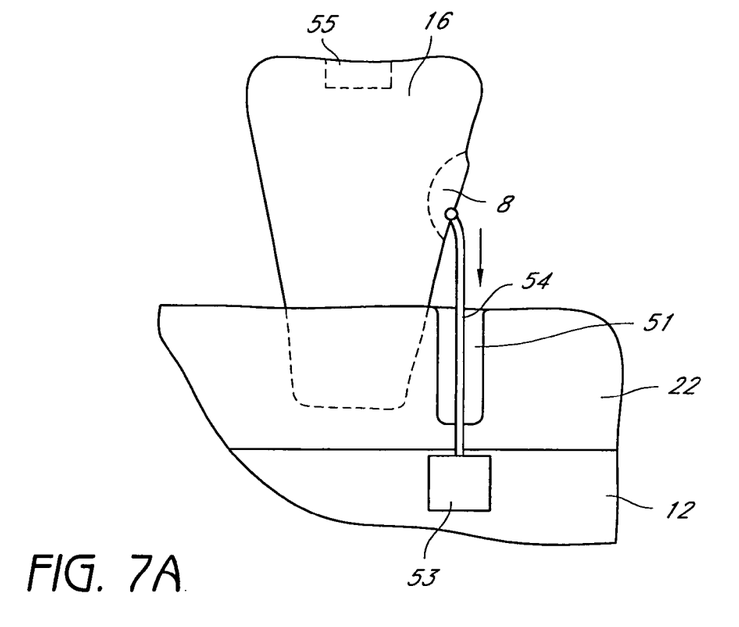
FIGS. 7A and 7B are schematic side views of a tooth embedded in the gum, showing retractable enamel and an alternative embodiment of an enamel-removing device embedded in the gums.
Figure 7B:
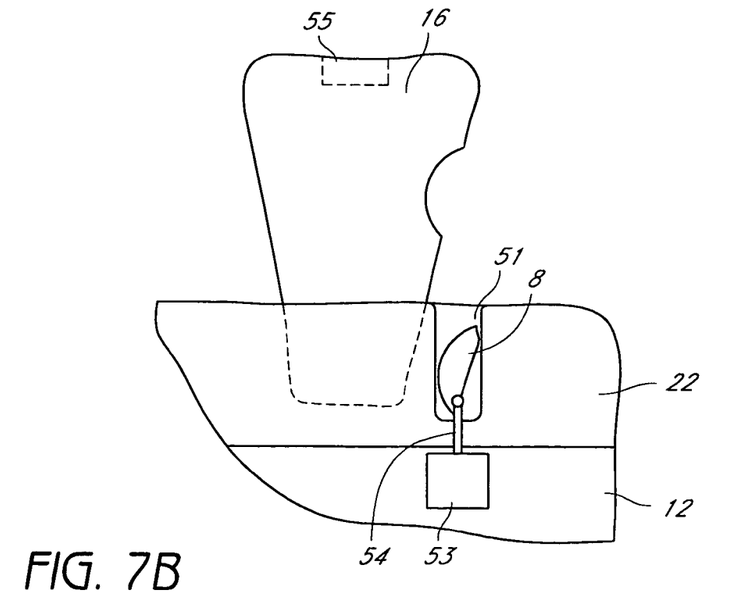

FIGS. 7A and 7B show side sectional views of another preferred embodiment, wherein the removable enamel 8 is retracted into a enamel-receiving space 51 within the gums 22. A retracting device 53 preferably causes an enamel-removing member 54, which is attached to the removable enamel 8, to pull the removable enamel into the enamel-receiving space 51 within the gums 22. Preferably, the gum line hides the connection between the enamel-removing member 54 and the region of removable enamel 8, so that to the patients and/or students, the enamel 8 appears to recede into the gums. The resulting configuration, wherein the removable enamel 8 is retracted into the enamel-receiving space 51, can be used to depict a tooth with removed enamel (FIG. 7B). In one preferred embodiment, the retracting device 53 comprises an electric or battery powered motor. In particularly preferred embodiments, a contact sensor 55 is embedded beneath the surface of tooth, and is adapted to sense contact between teeth 16 of upper and lower jaws. When upper and lower teeth contact each other, the sensor preferably sends a signal through a wire, radio wave, or other signaling mechanism known to those skilled in the art, which causes the retracting device 53 to move the enamel-removing member 54. In particularly preferred embodiments, the process may be reversed and repeated. Preferred embodiments comprise a plurality of teeth similar to the one depicted in FIG. 6. The process of enamel removal may occur simultaneously in a plurality of teeth. Preferred embodiments of the enamel removal process/system may be utilized in a variety of tooth types on upper and lower jaws, including: incisors, cuspids, bicuspids, canines, premolars, molars, and other forms of teeth known to those skilled in the art.

Figure 8A:
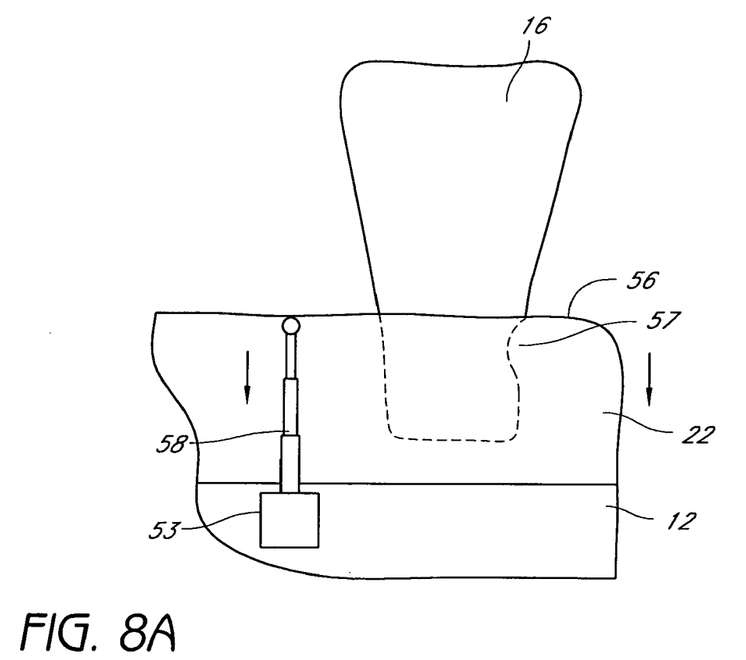
FIGS. 8A and 8B are schematic side views of a tooth embedded in the gum, showing an enamel-depleted portion of the tooth which is exposed when the gums are retracted by a device.
Figure 8B:
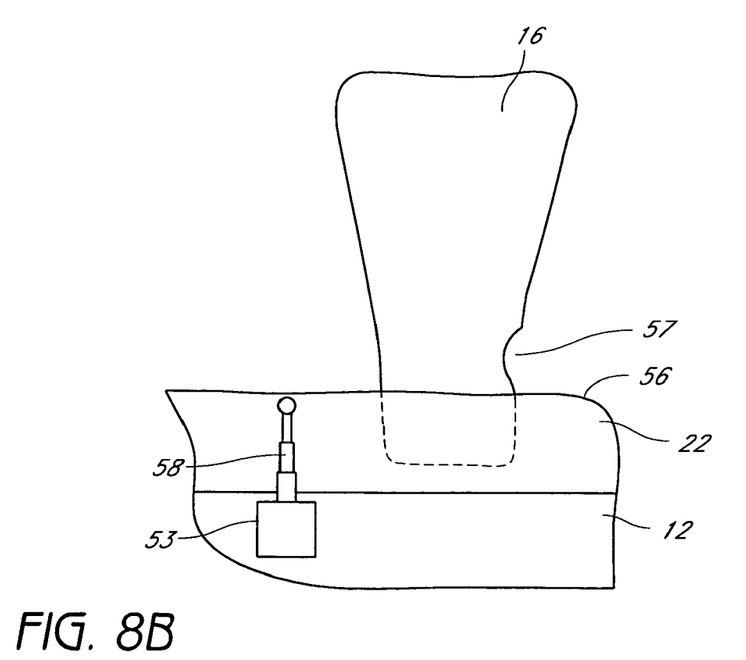

In another preferred embodiment, shown in FIGS. 8A and 8B, the gum 22 is moved downward to demonstrate gum recession, optionally exposing an area of eroded enamel 57 of the tooth 16 that was previously concealed beneath the gum line 56. In some embodiments, the model can be used to demonstrate gum recession without enamel erosion. In the embodiment shown in FIGS. 8A and 8B, the tooth 16 is formed with enamel already removed from the portion that will become exposed 57 when the gum line 56 is receded. In other preferred embodiments, the exposed portion 57 may comprise the removable enamel and an enamel removing system, such as those illustrated in FIGS. 6 and 7. A retracting device 53 preferably causes a gum-retracting member 58, which is attached to the gum 22, to pull the gum so that the exposable portion 57 of the tooth 16 becomes exposed. The resulting configuration, wherein the gum 22 and gum line 56 are receded, can be used to depict a tooth in which enamel is lost as a result of receding gums. In one preferred embodiment, the retracting device 53 comprises an electric or battery powered motor. In particularly preferred embodiments, a contact sensor 55 is embedded beneath the surface of tooth, and is adapted to sense contact between teeth 16 of upper and lower jaws. When upper and lower teeth contact each other, the sensor preferably sends a signal through a wire, radio wave, or other signaling mechanism known to those skilled in the art, which causes the retracting device 53 to move the enamel-removing member 54. In particularly preferred embodiments, the process may be reversed and repeated. Preferred embodiments of the present invention comprise a plurality of teeth. The process of enamel removal may occur simultaneously in a plurality of teeth. Preferred embodiments of the enamel removal process/system may be utilized in a variety of tooth types on upper and lower jaws, including: incisors, cuspids, bicuspids, canines, premolars, molars, and other forms of teeth known to those skilled in the art.

Other preferred embodiments of the dental model may contain pigment to show discoloration of teeth which may result from tooth enamel removal and/or gum recession. Preferred embodiments may also demonstrate, for example, tooth discoloration, tooth erosion, tooth brittleness, loss of attached gingivae, tooth fracture, tooth cracking, pain resulting from chewing or extreme temperature changes, loss of vertical dimension of occlusion, loss of periodontium, tooth mobility, tooth loss, and other undesirable conditions known to those skilled in the art.

Those skilled in the art will appreciate that embodiments of the dental model can be used to explain gum recession and tooth enamel removal and their consequences to patients and dental students. Furthermore, those skilled in the art will appreciate that embodiments of the dental model can be used to recommend and demonstrate various treatments, and the results for such treatments, for gum recession and tooth enamel loss.

Although the foregoing description contains may specifics, these should not be construed as limiting the scope of the present invention, but merely as providing illustrations of some of the presently preferred embodiments. Similarly, other embodiments of the invention may be devised which do not depart from the spirit or scope of the present invention. All additions, deletions and modifications to the invention as disclosed herein which fall within the meaning and scope of the claims are to be embraced thereby.

What is claimed is:

1. A dental model, comprising:
   a jaw member; and
   a tooth attached to said jaw member,
   wherein said jaw member further comprises artificial gums which contact the tooth along a region where said tooth is attached to said jaw member, wherein said gums are adapted to partially recede into said jaw member, wherein said tooth further comprises a removable portion, and wherein said removable portion of said tooth is located in the region of said tooth exposed by the receding of said gums.

2. A dental model, comprising:
an upper jaw member;
a lower jaw member; and
at least one tooth attached to each jaw member, wherein a first tooth further comprises a removable portion, and wherein contact between teeth in said upper and lower jaw members causes the removable portion to detach from the first tooth.

3. A dental model, comprising:
an upper jaw member;
a lower jaw member; and
at least one tooth attached to each jaw member, wherein a first tooth further comprises a removable portion, wherein at least one of said jaw members further comprises artificial gums which contact the first tooth along a region where the first tooth is attached to said jaw member, and wherein contact between teeth in said upper and lower jaw members causes the gums to partially recede into at least one of said jaw members.

4. A dental model, comprising:
an upper and a lower jaw member in hinged articulation with one another;
a plurality of teeth seated within receiving sockets in each of said upper and lower jaw members, such that a root portion of each tooth resides within a receiving socket and an outer portion extends outwardly from said jaw member, wherein at least one tooth further comprises an enamel portion located on the outer portion of said at least one tooth, said enamel portion being movable relative to said at least one tooth;
artificial gums in contact with said at least one tooth and overlapping partially with both the outer portion of said at least one tooth and the jaw member in which said at least one tooth is seated; and
an actuator in functional communication with a means for moving said enamel portion, such that upon actuation, the dental model provides a visual demonstration of enamel loss.

5. The dental model of claim 4, wherein contact between teeth in said upper and lower jaw members pushes said actuator.

6. A dental model, comprising:
an upper and a lower jaw member in hinged articulation with one another;
a plurality of teeth seated within receiving sockets in each of said upper and lower jaw members, such that a root portion of each tooth resides within a receiving socket and an outer portion extends outwardly from said jaw member, wherein at least one tooth further comprises an eroded enamel portion located on the outer portion of said at least one tooth;
retractable artificial gums in contact with said at least one tooth and covering said enamel portion; and
means for retracting said artificial gums, such that upon retraction, the dental model provides a visual demonstration of enamel loss due to receding gums.

7. The dental model of claim 2, wherein a second tooth is removably seated within a receiving socket in at least one of said jaw members.

8. The dental model of claim 2, wherein at least one of said jaw members further comprises artificial gums which contact the first tooth where the first tooth is attached to said jaw member.

9. The dental model of claim 8, wherein the gums comprise an elastic material.

10. The dental model of claim 8, wherein said removable portion of said first tooth is movable to a location between said gums and said first tooth.

11. The dental model of claim 8, wherein said gums are adapted to partially recede into said jaw member.

12. The dental model of claim 11, wherein a region of a third tooth exposed by the receding of said gums is discolored.

13. The dental model of claim 2, wherein the upper and lower jaw members are connected to one another via a hinged articulation, such that the jaw members move relative to one another in a manner resembling a mammalian mouth.

14. The dental model of claim 9, wherein said hinged articulation further comprises a spring.

15. The dental model of claim 2, wherein said removable portion of said first tooth can be retracted into said first tooth.

16. The dental model of claim 2, wherein said removable portion of said first tooth is adapted to manually detach from said first tooth.

* * * * *